(12) United States Patent
Kochiyama et al.

(10) Patent No.: US 10,619,700 B2
(45) Date of Patent: Apr. 14, 2020

(54) SEISMIC ISOLATION APPARATUS

(71) Applicant: OILES CORPORATION, Tokyo (JP)

(72) Inventors: Osamu Kochiyama, Ashikaga (JP); Kenta Nagahiro, Ashikaga (JP)

(73) Assignee: Oiles Corporation, Tokyo (JP)

(\*) Notice: Subject to any disclaimer, the term of this patent is extended or adjusted under 35 U.S.C. 154(b) by 0 days.

(21) Appl. No.: 16/093,745

(22) PCT Filed: Apr. 12, 2017

(86) PCT No.: PCT/JP2017/015036
§ 371 (c)(1),
(2) Date: Oct. 15, 2018

(87) PCT Pub. No.: WO2017/183542
PCT Pub. Date: Oct. 26, 2017

(65) Prior Publication Data
US 2019/0120321 A1  Apr. 25, 2019

(30) Foreign Application Priority Data
Apr. 19, 2016 (JP) ................. 2016-083925

(51) Int. Cl.
*F16F 15/04* (2006.01)
*F16F 1/40* (2006.01)
*E04H 9/02* (2006.01)

(52) U.S. Cl.
CPC ............. *F16F 15/04* (2013.01); *E04H 9/022* (2013.01); *F16F 1/40* (2013.01)

(58) Field of Classification Search
CPC ............. F16F 15/04; F16F 1/40; E04H 9/022
See application file for complete search history.

(56) References Cited

U.S. PATENT DOCUMENTS

| 3,558,935 | A | * | 1/1971 | Gritton et al. | ........... G21C 1/22 |
| | | | | | 376/321 |
| 4,633,119 | A | * | 12/1986 | Thompson | ............ B06B 1/0618 |
| | | | | | 310/321 |
| 5,655,756 | A | | 8/1997 | Robinson | |
| 5,761,856 | A | | 6/1998 | Kishizono et al. | |

(Continued)

FOREIGN PATENT DOCUMENTS

| CN | 1339642 A | 3/2002 |
| CN | 101535677 A | 9/2009 |

(Continued)

OTHER PUBLICATIONS

International Search Report for PCT/JP2017/015036, dated Jun. 27, 2017, 4 pages.

(Continued)

*Primary Examiner* — Paola Agudelo
(74) *Attorney, Agent, or Firm* — Nixon & Vanderhye P.C.

(57) ABSTRACT

A seismic isolation apparatus 1 includes a laminated body 7 having alternately laminated a plurality of elastic layers 2 and rigid layers 3, and a lead plug 17 being disposed therein without clearances in a hollow portion 14 extending in a laminated direction V of the laminated body 7 with respect to inner peripheral surfaces 15 of the elastic layers 2, inner peripheral surfaces 16 of the rigid layers 3, a lower surface 12 of an upper plate 10, and an upper surface 13 of a lower plate 11.

9 Claims, 7 Drawing Sheets

(56) References Cited

U.S. PATENT DOCUMENTS

| | | | | |
|---|---|---|---|---|
| 5,955,822 | A * | 9/1999 | Schutze | F16F 15/005 310/311 |
| 6,036,163 | A * | 3/2000 | Yamada | B64D 27/00 244/54 |
| 6,290,201 | B1 * | 9/2001 | Kanie | F16F 15/04 248/562 |
| 7,160,607 | B2 * | 1/2007 | Tanimoto | B32B 27/04 428/297.4 |
| 9,915,079 | B2 * | 3/2018 | Shu | E02D 27/34 |
| 2005/0204754 | A1 * | 9/2005 | Vuillermoz | F04D 29/601 62/55.5 |
| 2010/0007069 | A1 | 1/2010 | Kawada | |
| 2010/0255233 | A1 | 10/2010 | Wakana et al. | |
| 2016/0122498 | A1 * | 5/2016 | Wake | C08K 3/04 52/167.1 |
| 2016/0146283 | A1 * | 5/2016 | Sato | F16F 15/04 267/141.1 |
| 2017/0268225 | A1 * | 9/2017 | Wake | B32B 7/02 |
| 2018/0030749 | A1 * | 2/2018 | Wake | E04H 9/02 |
| 2018/0051764 | A1 * | 2/2018 | Wake | C08K 3/22 |
| 2019/0120321 | A1 * | 4/2019 | Kochiyama | F16F 15/04 |

FOREIGN PATENT DOCUMENTS

| | | |
|---|---|---|
| CN | 101896734 A | 11/2010 |
| CN | 102121282 A | 7/2011 |
| CN | 105339702 A | 2/2016 |
| JP | 4-49384 | 2/1992 |
| JP | 11-159573 A | 6/1999 |
| JP | 3024562 B2 | 1/2000 |
| JP | 2001-74096 | 3/2001 |
| JP | 3360828 B2 | 10/2002 |
| JP | 2006-170233 A | 6/2006 |
| JP | 2009-8181 | 1/2009 |
| JP | 2013-188959 | 9/2013 |
| JP | 2013-217483 | 10/2013 |
| JP | 2015-7468 | 1/2015 |
| JP | 3205393 | 7/2016 |

OTHER PUBLICATIONS

First Office Action dated Nov. 6, 2019 in Chinese Application No. 201780024281.6, with English translation, 18 pages.

Notice of Submission of Publications, etc. dated Jan. 15, 2019 and Written request for inspection (public inspection) of items recorded in file dated Dec. 12, 2018 in Japanese application No. 2016-083925, with English translation, 17 pages.

Notice of Reasons for Refusal dated Oct. 8, 2019 in Japanese application No. 2016-083925, with English translation, 10 pages.

KIPO Notification of Reason for Refusal dated Oct. 16, 2019 in Korean application No. 2018-7029787, with English translation, 11 pages.

* cited by examiner

γ 10%

γ 50%

γ 100%

γ 10%

γ 50%

γ 100%

SEISMIC ISOLATION APPARATUS

This application is the U.S. national phase of International Application No. PCT/JP2017/015036 filed 12 Apr. 2017, which designated the U.S. and claims priority to JP Patent Application No. 2016-083925 filed 19 Apr. 2016, the entire contents of each of which are hereby incorporated by reference.

TECHNICAL FIELD

The present invention relates to an apparatus for reducing vibration acceleration to a structure by being disposed between two structures and by absorbing relative horizontal vibrational energy between the two structures, specifically to a seismic isolation apparatus for preventing damage to a structure such as a building, a bridge, and the like by reducing seismic input acceleration by attenuating seismic energy.

BACKGROUND ART

A seismic isolation apparatus is known which is comprised of a laminated body having alternately laminated elastic layers and rigid layers and a hollow portion defined by inner peripheral surfaces of these elastic layers and rigid layers, as well as a lead plug (lead column) disposed in the hollow portion of this laminated body.

Such a seismic isolation apparatus, while supporting the vertical load of a structure through the laminated body and the lead plug, is adapted to attenuate through the plastic deformation (shear deformation) of the lead plug the vibration in the horizontal direction of the structure with respect to one end in a laminated direction of the laminated body attributable to an earthquake, and also to suppress through the elastic deformation (shear deformation) of the laminated body the transmission, to the structure, of the vibration in the horizontal direction of the one end in the laminated direction of the laminated body ascribable to the earthquake.

PRIOR ART DOCUMENT

Patent Document

[Patent Document 1] JP-A-2009-8181

SUMMARY OF THE INVENTION

Problems that the Invention is to Solve

Incidentally, with this type of seismic isolation apparatus, lead is filled into the hollow portion of the laminated body without a clearance to obtain a lead plug, and the lead plug filled and surrounded by inner peripheral surfaces of rigid layers and elastic layers of the laminated body is partially pushed back by the resiliency of the elastic layers. However, a stress (inner force) is generated in the lead plug owing to this pushing back.

If the generated stress of the lead plug is not sufficient in relation to the rigidity of the elastic layers, for instance in the seismic isolation operation of the seismic isolation apparatus under a low load, clearances can occur between the outer peripheral surface of the lead plug and the inner peripheral surfaces of the rigid layers and the elastic layers, so that there occurs a possibility that it becomes impossible to effectively attenuate vibrations by the lead plug.

Such a problem occurs noticeably with the lead plug, but can also occur with not only such a lead plug but a damping material constituted of such as lead, tin, or a non-lead-based low melting point alloy which absorbs vibrational energy through plastic deformation.

The present invention has been devised in view of the above-described aspects, and its object is to provide a seismic isolation apparatus which allows the vibration damping body disposed in the hollow portion of the laminated body to be restrained without a clearance as prescribed, thereby making it possible to obtain stable seismic isolation characteristics.

In addition, another object of the present invention is to provide a seismic isolation apparatus which particularly excels in the seismic isolation effect and manufacturability.

Means for Solving the Problems

A seismic isolation apparatus in accordance with the present invention comprises: a laminated body having alternately laminated elastic layers and rigid layers; and a vibration damping body which is filled, with a stress of not less than 8 MPa, in a hollow portion formed in the laminated body in such a manner as to extend in a laminated direction of the laminated body.

The present invention has been devised on the basis of a finding that, in a seismic isolation apparatus in which a stress occurring in the vibration damping body based on the elastic reaction force of the elastic layers ascribable to the pressing against the inner peripheral surfaces of the elastic layers by the vibration damping body is at a fixed level or greater, the vibration damping body disposed in the hollow portion can be restrained without a clearance as prescribed.

According to the present invention based on such a finding, if the vibration damping body is densely disposed in the hollow portion with a stress of not less than 8 MPa, even in the shear deformation of the laminated body the vibration damping body disposed in the hollow portion can be restrained by the laminated body without a clearance as prescribed, with the result that it is possible to provide a seismic isolation apparatus capable of obtaining stable seismic isolation characteristics.

The seismic isolation apparatus in accordance with the present invention may be installed between one structure such as a bridge girder and another structure such as a side wall installed on a bridge pier, so as to seismically isolate, with respect to a bridge axis direction, the one structure such as the bridge girder without supporting the vertical load of the one structure such as the bridge girder. Alternatively, the seismic isolation apparatus in accordance with the present invention may be installed between one structure such as a building, a bridge girder, or the like and another structure such as a foundation, a bridge pier, or the like, so as to support the vertical load of the one structure such as the building, the bridge girder, or the like and to seismically isolate the one structure such as the building, the bridge girder, or the like. Accordingly, there are cases where the seismic isolation apparatus in accordance with the present invention is used under no load and cases where the seismic isolation apparatus in accordance with the present invention is used under a load. In the seismic isolation apparatus which is used in either case, it suffices if the vibration damping body is filled in the hollow portion with a stress of not less than 8 MPa under no load or under a load on the laminated body in the laminated direction, i.e., in a preferred embodiment, under a load on the laminated body in the laminated direction corresponding to a bearing pressure of 0.5 MPa with respect to that laminated body.

In addition, in the seismic isolation apparatus in accordance with the present invention, during its seismic isolation operation, shear deformation occurs in the laminated body mainly due to the elastic deformation of the elastic layers, and the vibration damping body relating to the seismic isolation apparatus of the present invention is filled in the hollow portion with a stress of not less than 8 MPa in a state in which such shear deformation has not occurred.

In a preferred embodiment of the seismic isolation apparatus in accordance with the present invention, the vibration damping body is filled in the hollow portion with a stress of not less than 15 MPa. In such an embodiment, even in slight shear deformation of the laminated body, the vibration damping body disposed in the hollow portion of the laminated body can be restrained without a clearance as prescribed, with the result that it is possible to obtain further stable seismic isolation characteristics.

Incidentally, in the present invention, it suffices if the vibration damping body is filled in the hollow portion with a stress of not less than 8 MPa. However, with the seismic isolation apparatus in which the vibration damping body is filled in the hollow portion with a stress exceeding 55 MPa, the vibration damping body greatly bites into the elastic layers, and inner peripheral surfaces of the elastic layers become excessively concave, so that the shear stress between the elastic layer and the rigid layer in the vicinity of such a portion becomes excessively large. Therefore, to obtain a vibration damping body having such a stress, the press-fitting force of the vibration damping body into the hollow portion must be made extremely large, and it was thus found that the manufacture of the seismic isolation apparatus is difficult.

Accordingly, with the seismic isolation apparatus in which the vibration damping body is filled in the hollow portion with a stress of not less than 8 MPa and not greater than 55 MPa, even in the shear deformation of the laminated body, the vibration damping body disposed in the hollow portion of the laminated body can be restrained without a clearance as prescribed, with the result that it is possible to obtain stable seismic isolation characteristics, and the seismic isolation effect and manufacturability are particularly excellent.

In the seismic isolation apparatus in which the vibration damping body is filled in the hollow portion with a stress of not less than 8 MPa, in a preferred embodiment, an inner peripheral surface of the laminated body defining the hollow portion is formed into concave surfaces at positions of the elastic layers as the vibration damping body bites into the elastic layers. In another preferred embodiment, the inner peripheral surface of the laminated body defining the hollow portion is formed into convex surfaces at positions of the rigid layers as the vibration damping body bites into the elastic layers.

In the present invention, in a preferred embodiment, the vibration damping body is formed of a damping material which absorbs vibrational energy through plastic deformation, and such a damping material may be constituted of lead, tin, or a non-lead-based low melting point alloy (e.g., a tin-containing alloy selected from a tin-zinc-based alloy, a tin-bismuth-based alloy, and a tin-indium-based alloy; specifically, such as a tin-bismuth alloy containing 42 to 43 wt. % of tin and 57 to 58 wt. % of bismuth) and, in a most preferred embodiment, may be constituted of a simple substance of pure lead with a purity of 99.9% or greater.

In the present invention, as the material of the elastic layer, it is possible to cite such as natural rubber, silicone rubber, highly damping rubber, urethane rubber, or chloroprene rubber, but natural rubber is preferable. Each of the elastic layers preferably has a thickness of 1 mm to 30 mm or thereabouts in a no-load condition, but the invention is not limited to the same. In addition, as the material of the rigid layer, it is possible to cite a steel plate, a fiber-reinforced synthetic resin using a carbon fiber, a glass fiber, an aramid fiber, or the like, a fiber-reinforced hard rubber, and the like. Each of the rigid layers may have a thickness of 1 mm to 6 mm or thereabouts, and the rigid layers at one end and the other end in the laminated direction may have a thickness of 10 mm to 50 mm or thereabouts, but the invention is not limited to the same. In addition, the elastic layers and the rigid layers in terms of their numbers are not particularly limited, and the numbers of the elastic layers and the rigid layers may be determined to obtain stable seismic isolation characteristics from the viewpoints of the estimated magnitude of vibration acceleration to the structure, the load of the structure to be supported, the amount of shear deformation (amount of horizontal strain), the modulus of elasticity of the elastic layers, and the like.

In addition, in the present invention, the laminated body and the vibration damping body are preferably an annular body and a cylindrical body, respectively, but may have another shape, such as an elliptical or square shape and an elliptical or square shape, respectively. The hollow portion may be singular, but the seismic isolation apparatus may alternatively have a plurality of hollow portions, and the seismic isolation apparatus may be constructed by disposing vibration damping bodies in the respective hollow portions. It should be noted that, with respect to each of these hollow portions, the stress of the vibration damping body need not be identical, and the stress may be respectively different. In addition, the stress of the vibration damping body is preferably not less than 8 MPa with respect to each of these hollow portions, but the stress of the vibration damping body may be not less than 8 MPa with respect to only some of the plurality of hollow portions.

Advantages of the Invention

According to the present invention, it is possible to provide a seismic isolation apparatus which allows the vibration damping body disposed in the hollow portion of the laminated body to be restrained without a clearance as prescribed, thereby making it possible to obtain stable seismic isolation characteristics.

In addition, according to the present invention, it is possible to provide a seismic isolation apparatus which particularly excels in the seismic isolation effect and manufacturability.

MODE FOR CARRYING OUT THE INVENTION

Figure 1:
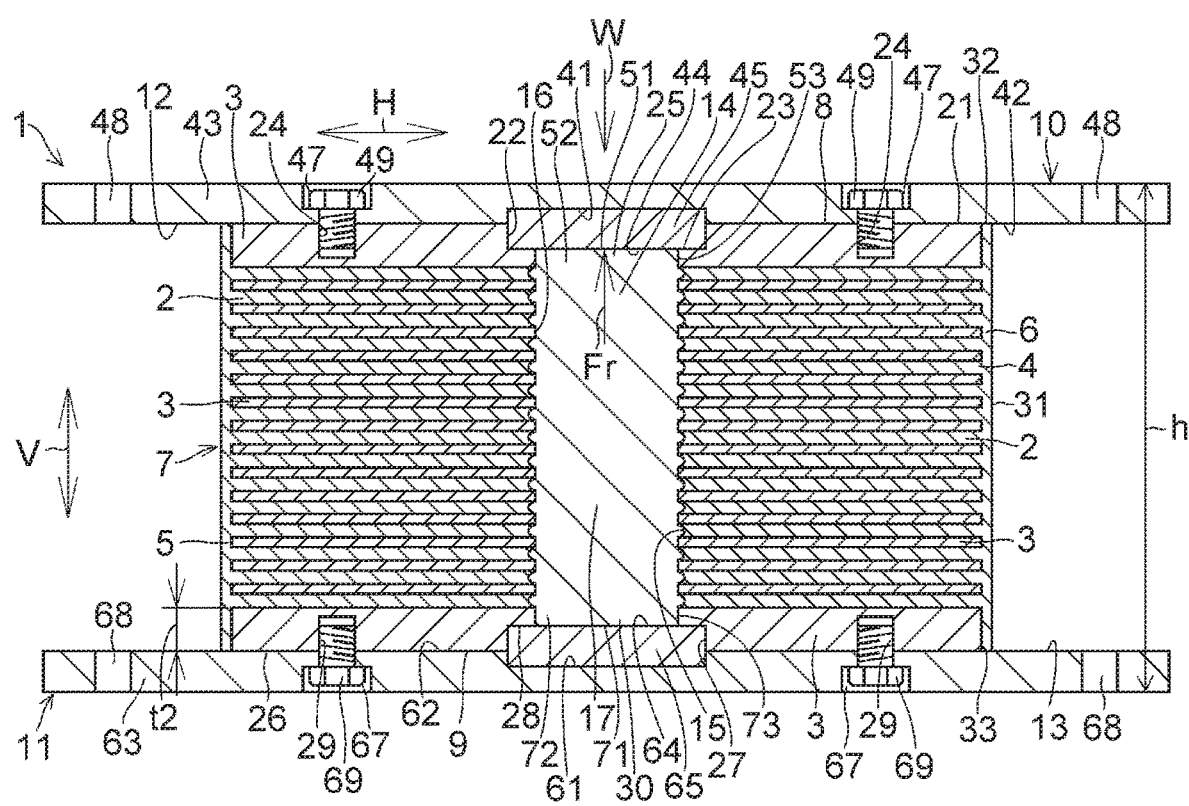
FIG. 1 is an explanatory cross-sectional view, taken in the direction of arrows along line I-I shown in FIG. 2, of a preferred embodiment for carrying out the invention.

Hereafter, a description will be given of the present invention and the mode for carrying it out on the basis of preferred embodiments illustrated in the drawings. It should be noted that the present invention is not limited to these embodiments.

Figure 2:
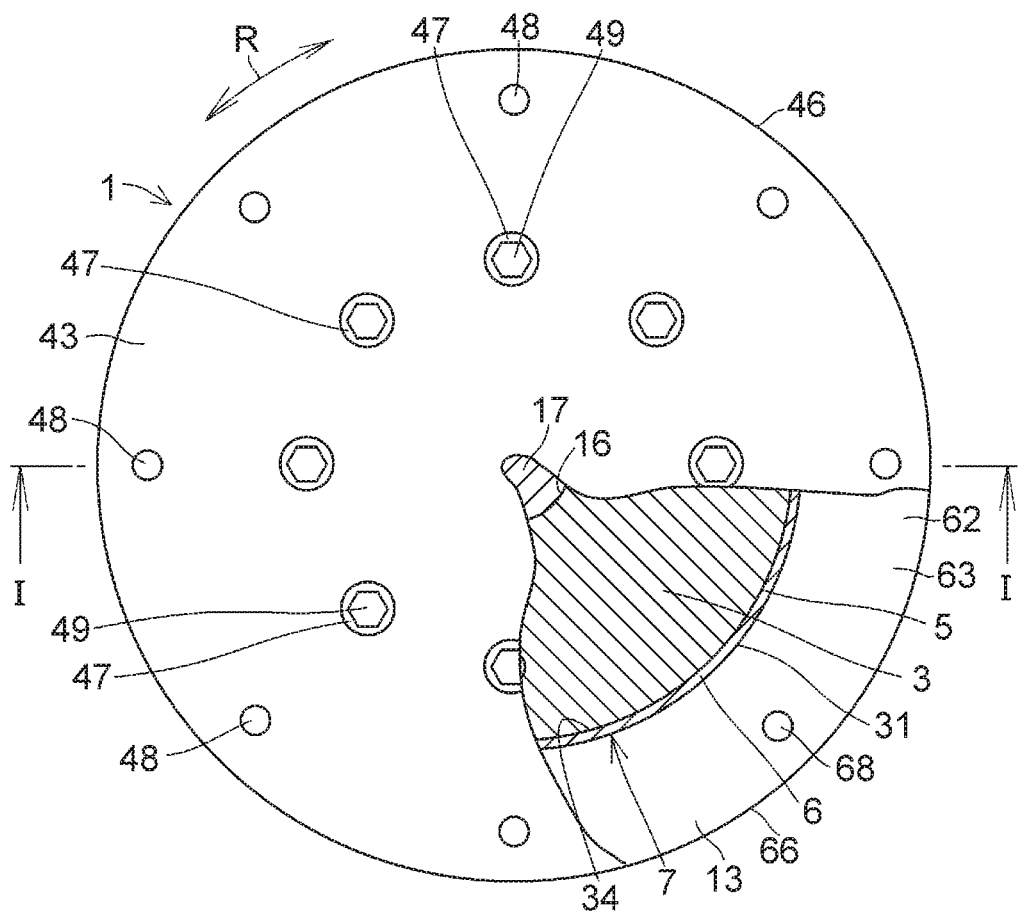
FIG. 2 is an explanatory partially cross-sectional view of the embodiment shown in FIG. 1.
Figure 3:
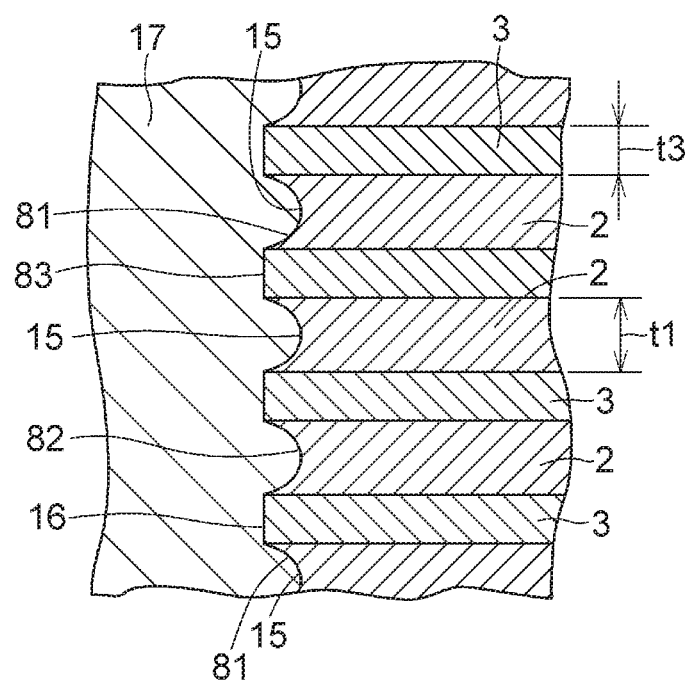
FIG. 3 is an explanatory partially enlarged cross-sectional view of the embodiment shown in FIG. 1.

A seismic isolation apparatus 1 of this embodiment shown in FIGS. 1 to 3 is comprised of a cylindrical laminated body 7 including, in addition to pluralities of alternately laminated elastic layers 2 and rigid layers 3, a cylindrical coating layer 6 coating cylindrical outer peripheral surfaces 4 and 5 of the elastic layers 2 and the rigid layers 3; an upper plate 10 and a lower plate 11 which are respectively mounted on an annular upper end face 8 and an annular lower end face 9 in a laminated direction (in this embodiment, also a vertical direction) V of the laminated body 7; and a lead plug 17 serving as a vibration damping body disposed in a hollow portion 14 which is surrounded by the elastic layers 2 and the rigid layers 3 and by the upper plate 10 and the lower plate 11 and extends in the laminated direction V from a lower surface 12 of the upper plate 10 to an upper surface 13 of the lower plate 11, the lead plug 17 being disposed therein without clearances with respect to inner peripheral surfaces 15 of the elastic layers 2, cylindrical inner peripheral surfaces 16 of the rigid layers 3, the lower surface 12 of the upper plate 10, and the upper surface 13 of the lower plate 11.

Each of the elastic layers 2, which is constituted of an annular rubber plate made of natural rubber with a thickness of t1=2.5 mm, is vulcanization bonded to the upper surface and the lower surface in the laminated direction V of the rigid layers 3 opposed thereto in the laminated direction V.

Among the rigid layers 3, each of the uppermost and lowermost rigid layers 3 in the laminated direction V is formed of a mutually identical annular steel plate with a thickness of t2=20 mm. The uppermost rigid layer 3 has a recess 23 which is open at an upper surface 21 thereof and is defined by a cylindrical inner peripheral surface 22, as well as a plurality of threaded holes 24 which are similarly open at the upper surface 21 and are arranged at equiangular intervals in a circumferential direction R. The recess 23, which is defined by the inner peripheral surface 22 having a greater diameter than the diameter of the inner peripheral surface 16 of the uppermost rigid layer 3 defining an upper portion 25 of the hollow portion 14 in the laminated direction V, communicates with the upper portion 25 of that hollow portion 14. The lowermost rigid layer 3 has a recess 28 which is open at a lower surface 26 thereof and is defined by a cylindrical inner peripheral surface 27 with the same diameter as the inner peripheral surface 22, as well as a plurality of threaded holes 29 which are similarly open at the lower surface 26 and are arranged at equiangular intervals in the circumferential direction R. The recess 28, which is defined by the inner peripheral surface 27 having a greater diameter than the diameter of the inner peripheral surface 16 of the lowermost rigid layer 3 defining a lower portion 30 of the hollow portion 14 in the laminated direction V, communicates with the lower portion 30 of that hollow portion 14. Each of the rigid layers 3 disposed between the uppermost rigid layer 3 and the lowermost rigid layer 3 in the laminated direction V is formed of a mutually identical annular steel plate with a thickness of t3=1.6 mm which is thinner than the uppermost and lowermost rigid layers 3.

The coating layer 6 has a thickness of 2 mm or thereabouts, is formed of the same natural rubber as the elastic layers 2, and has a cylindrical outer peripheral surface 31, an annular upper end face 32, and an annular lower end face 33. This coating layer 6 is vulcanization bonded to the outer peripheral surfaces 4 and 5 at a cylindrical inner peripheral surface 34 thereof.

The upper plate 10 has a disk-shaped upper flange plate 43 having at a lower surface 42 thereof a recess 41 opposed to the recess 23 in the laminated direction V with the same diameter as the diameter of the recess 23, as well as an upper shear key 45 which is fittingly secured to the upper flange plate 43 at the recess 41, is fittingly secured to the uppermost rigid layer 3 at the recess 23, and has a circular lower surface 44. The upper flange plate 43 having a cylindrical outer peripheral surface 46 has, in addition to the recess 41, a plurality of through holes 47 arranged at equiangular intervals in the circumferential direction R in correspondence with the plurality of threaded holes 24 in the laminated direction V and a plurality of through holes 48 arranged at equiangular intervals in the circumferential direction R in the vicinities of the outer peripheral surface 46. The upper flange plate 43 is fixed to the uppermost rigid layer 3 by means of bolts 49 which are inserted in the respective through holes 47 and are threadedly engaged with the uppermost rigid layer 3 in the respective threaded holes 24, while the upper flange plate 43 is adapted to be fixed to a supported superstructure by means of anchor bolts inserted in the through holes 48.

Thus, the lower surface 12 of the upper plate 10 having both the upper flange plate 43 and the upper shear key 45 is constituted by the lower surface 42 and the lower surface 44. The upper end face 8 constituted by both the upper surface 21 and the upper end face 32 is in contact with the lower surface 42 at the lower surface 12 without a clearance, and the lead plug 17 at its circular upper end face 51 is in contact with the lower surface 44 at the lower surface 12 without a clearance, while an outer peripheral surface 53 of an upper end portion 52 in the laminated direction V of the lead plug 17 disposed in the upper portion 25 is in contact with the inner peripheral surface 16 of the uppermost rigid layer 3 without a clearance.

The lower plate 11 has a disk-shaped lower flange plate 63 having at a upper surface 62 thereof a recess 61 opposed to the recess 28 in the laminated direction V with the same diameter as the diameter of the recess 28, as well as a lower shear key 65 which is fittingly secured to the lower flange plate 63 at the recess 61, is fittingly secured to the lowermost rigid layer 3 at the recess 28, and has a circular upper surface 64. The lower flange plate 63 having a cylindrical outer peripheral surface 66 has, in addition to the recess 61, a plurality of through holes 67 arranged at equiangular intervals in the circumferential direction R in correspondence with the plurality of threaded holes 29 in the laminated direction V and a plurality of through holes 68 arranged at equiangular intervals in the circumferential direction R in the vicinities of the outer peripheral surface 66. The lower flange plate 63 is fixed to the lowermost rigid layer 3 by means of bolts 69 which are inserted in the respective through holes 67 and are threadedly engaged with the lowermost rigid layer 3 in the respective threaded holes 29, while the lower flange plate 63 is adapted to be fixed to a substructure to be mounted thereon, by means of anchor bolts inserted in the through holes 68.

Thus, the upper surface 13 of the lower plate 11 having both the lower flange plate 63 and the lower shear key 65 is constituted by the upper surface 62 and the upper surface 64. The lower end face 9 constituted by both the lower surface 26 and the lower end face 33 is in contact with the upper surface 62 at the upper surface 13 without a clearance, and the lead plug 17 at its circular lower end face 71 is in contact with the upper surface 64 at the upper surface 13 without a clearance, while an outer peripheral surface 73 of a lower end portion 72 in the laminated direction V of the lead plug 17 disposed in the lower portion 30 is in contact with the inner peripheral surface 16 of the lowermost rigid layer 3 without a clearance.

The lead plug 17, which is formed of lead, i.e., a damping material for absorbing vibrational energy through plastic deformation, is press-fitted and filled in the hollow portion 14 defined by the lower surface 44, the inner peripheral surfaces 15 and 16, and the upper surface 64. Through such fitting and filling, even in a state (no-load state) in which a load W in the laminated direction V from the supported superstructure is not being applied to the upper plate 10, the lead plug 17 is disposed without a clearance with respect to the lower surface 44, the outer peripheral surfaces 4 and 5, and the upper surface 64, and slightly bites into the elastic layers 2 by jutting out toward the elastic layers 2 in a horizontal direction (shearing direction) H against the resiliency of the elastic layers 2 to thereby form the inner peripheral surfaces 15 of the elastic layers 2 into concave surfaces 81, with the result that an inner peripheral surface 82 of the laminated body 7, which is constituted by the inner peripheral surfaces 15 and 16, is formed into the concave surfaces 81 at the positions of the inner peripheral surface 15 of those elastic layers 2 and into convex surfaces 83 at the positions of the rigid layers 3. In a state (loaded state) in which the load W in the laminated direction V from the supported superstructure is being applied to the upper plate 10, the elastic layers 2 are compressed in the laminated direction V, so that the thickness t of the elastic layer 2 becomes smaller than 2.5 mm, and the height h of the seismic isolation apparatus 1 becomes lower. As a result, the lead plug 17 press-fitted and filled into the hollow portion 14 further bites into the elastic layers 2 by jutting out toward the elastic layers 2 in the horizontal direction H against the resiliency of the elastic layers 2 to thereby form the inner peripheral surfaces 15 of the elastic layers 2 into the concave surfaces 81 which are more concaved in the horizontal direction (shearing direction) H.

The lead plug 17 is filled and densely disposed in the hollow portion 14 such that a stress of not less than 8 MPa, in this embodiment, 39 MPa upon application of the load W of 566 KN, will be produced as a stress Pr (=Fr/(area of the upper end face 51 of the lead plug 17) N/m$^2$, where N is newton; hereinafter the same) for causing the upper shear key 45 to produce a reaction force (a force directed upwardly in the laminated direction V) Fr upon application of the load (a force directed downwardly in the laminated direction V) W in the laminated direction V from the supported superstructure.

The above-described seismic isolation apparatus 1 is disposed between the substructure and the superstructure with the lower flange plate 63 affixed to the substructure by means of the anchor bolts inserted in the through holes 68 and with the upper flange plate 43 affixed to the superstructure by means of the anchor bolts inserted in the through holes 48. Upon receiving the weight W of the superstructure, the seismic isolation apparatus 1 is adapted to support through the laminated body 7 and the lead plug 17 the load W in the laminated direction V applied to the upper plate 10, attenuate through the plastic deformation of the lead plug 17 the vibration in the horizontal direction H of the upper plate 10 with respect to the lower plate 11, and suppress through the shear elastic deformation in the horizontal direction H of the laminated body 7 the transmission of the vibration in the horizontal direction H of the lower plate 11 to the upper plate 10.

In manufacturing the seismic isolation apparatus 1, first, a plurality of annular rubber plates with a thickness t1=2.5 mm, serving as the elastic layers 2, and a plurality of annular steel plates with a thickness t3=1.6 mm, serving as the rigid layers 3 between the uppermost and lowermost rigid layers 3, are alternately laminated, and annular steel plates with a thickness t2=20 mm, serving as the uppermost and lowermost rigid layers 3, are respectively disposed on the lower surface and the upper surface of the laminated assembly thereof. These members are mutually fixed to each other through such as vulcanization bonding under pressure in a mold to thereby form the laminated body 7. Subsequently, the lower plate 11 constituted by both the lower shear key 65 and the lower flange plate 63 is affixed to the lowermost rigid layer 3 through the bolts 69 and, next, lead is press-fitted into the hollow portion 14 to form the lead plug 17 in the hollow portion 14. The press-fitting of lead is effected by pressing lead into the hollow portion 14 by means of a hydraulic ram or the like so that the lead plug 17 is restrained without a clearance in the hollow portion 14 by the laminated body 7. After the press-fitting of lead, the upper plate 10 constituted by both the upper flange plate 43 and the upper shear key 45 is affixed to the uppermost rigid layer 3 through the bolts 49. It should be noted that in the formation of the laminated body 7 by vulcanization bonding under pressure in the mold, a rubber sheet serving as the coating layer 6 may be wound around the outer peripheral surfaces 4 and 5 of the elastic layers 2 and the rigid layers 3 in such a manner as to cover the outer peripheral surfaces 4 and 5, and the coating layer 6 vulcanization bonded to the outer peripheral surfaces 4 and 5 of the elastic layers 2 and the rigid layers 3 may be formed simultaneously with the vulcanization bonding. In addition, in such formation, parts on the inner peripheral side of the rubber plates serving as the elastic layers 2 may flow and cover the inner peripheral surfaces 16 of the rigid layers 3 to thereby form a coating layer which is sufficiently thinner than the 2 mm thickness of the coating layer 6.

To confirm that the stress Pr of the lead plug 17 of the seismic isolation apparatus manufactured to be used under a specific load inclusive of no load on the laminated body 7, i.e., in this embodiment the seismic isolation apparatus 1 manufactured to be used under the load W of 566 KN is 39 MPa which is not less than 8 MPa, in other words, to manufacture the seismic isolation apparatus 1 which supports the load W of 566 KN at the upper end face 8 and in which the stress Pr of the lead plug 17 is 39 MPa, a load cell (pressure sensor) is interposed between the upper flange plate 43 and a temporary upper shear key which corresponds to the upper shear key 45 and is thinner than the upper shear key 45 fittingly secured in the recess 41 and the recess 23, a lead wire from the load cell is led out from a fine hole formed in the upper flange plate 43, and an electrical signal from the lead wire thus led out is measured. The stress Pr is detected from this measured electrical signal, and if the detected stress Pr is 39 MPa, the upper flange plate 43 is removed, the temporary upper shear key is replaced by the upper shear key 45, and the upper flange plate 43 is fixed again to the uppermost rigid layer 3 by means of the bolts 49. If the detected stress Pr is less than 8 MPa under a specific load on the laminated body 7, i.e., in this embodiment, if the detected stress Pr is less than 39 MPa under the load of 566 KN on the laminated body 7, the upper flange plate 43 and the temporary upper shear key are removed, and additional lead is press-fitted into the hollow portion 14. The press-fitting of the additional lead into the hollow portion 14 is effected by pressing the additional lead into the upper portion of the hollow portion 14 by means of a hydraulic ram or the like. After the press-fitting of the additional lead into the hollow portion 14, the upper flange plate 43, the temporary shear key, and the load cell (pressure sensor) between the upper flange plate 43 and the temporary shear key are fixed to the uppermost rigid layer 3 by means of the bolts 49, and the stress Pr from the load cell is detected. If the stress Pr is not less than 8 MPa under a specific load on the laminated body 7, i.e., in this embodiment, if the stress Pr is 39 MPa under the load W of 566 KN on the laminated body 7, the upper shear key 45 instead of the temporary upper shear key and the upper flange plate 43 are fixed to the uppermost rigid layer 3 by means of the bolts 49 in the same way as described above. On the other hand, if the stress Pr is less than 8 MPa under a specific load on the laminated body 7, the above-described press-fitting of the additional lead into the hollow portion 14 is repeated until the stress Pr becomes not less than 8 MPa under a specific load on the laminated body 7. In this embodiment, if the stress Pr is less than 39 MPa under the load W of 566 KN on the laminated body 7, the above-described press-fitting of the additional lead into the hollow portion 14 is repeated until the stress Pr reaches 39 MPa under the load W of 566 KN on the laminated body 7.

Furthermore, it should be noted that although an attempt was made to fill the lead plug 17 into the hollow portion 14 with a stress exceeding 55 MPa under no load on the laminated body 7, the press-fitting into the hollow portion 14 was difficult.

With the seismic isolation apparatus 1 thus manufactured, since the stress Pr of the lead plug 17 is not less than 8 MPa under a specific load on the laminated body 7, it is possible to allow the lead plug 17 disposed in the hollow portion 14 to be restrained by the elastic layers 2, the rigid layers 3, the upper plate 10, and the lower plate 11 without a clearance as prescribed, with the result it is possible to obtain stable seismic isolation characteristics, and obtain particularly excellent durability, seismic isolation effect, and manufacturability.

Seismic Isolation Apparatus 1 of Example 1

A seismic isolation apparatus 1, in which lead was filled into the hollow portion 14 so that the stress Pr of the lead plug 17 became 8 MPa under no load (load W=0), was manufactured by using, as the elastic layers 2, 20 annular rubber plates formed of natural rubber and having a thickness t1=2.5 mm, a diameter (outside diameter) of the outer peripheral surface 4=250 mm, a diameter (inside diameter) of the cylindrical inner peripheral surface 15 before deformation=50 mm, and a shear modulus of elasticity=G4, by using, as the uppermost and lowermost rigid layers 3, steel plates each having a thickness t2=20 mm, a diameter (outside diameter) of the outer peripheral surface 5=250 mm, a diameter (inside diameter) of the inner peripheral surface 16=50 mm, and a depth of each of the recesses 23 and 28=10 mm, and by using, as the rigid layers 3 between the uppermost and lowermost rigid layers 3, 19 steel plates each having a thickness t3=1.6 mm, a diameter (outside diameter) of the outer peripheral surface 5=250 mm, and a diameter (inside diameter) of the inner peripheral surface 16=50 mm.

Seismic Isolation Apparatus 1 of Example 2

A seismic isolation apparatus 1 similar to that of Example 1 was manufactured except that the lead was filled into the hollow portion 14 so that the stress Pr of the lead plug 17 became 17 MPa when such a load W that the bearing pressure at the upper end face 8 became 0.5 MPa was supported.

Seismic Isolation Apparatus 1 of Example 3

A seismic isolation apparatus 1 similar to that of Example 1 was manufactured except that the lead was filled into the hollow portion 14 so that the stress Pr of the lead plug 17 became 39 MPa when such a load W that the bearing pressure at the upper end face 8 became 12 MPa was supported. In the seismic isolation apparatus 1 of Example 3, the lead was filled into the hollow portion 14 so that the stress Pr of the lead plug 17 became 2 MPa under no load.

Seismic Isolation Apparatus of Comparative Example

A seismic isolation apparatus similar to those of Examples was manufactured except that the lead was filled into the hollow portion 14 so that the stress Pr of the lead plug 17 became 0 MPa under no load (load W=0). In the seismic isolation apparatus of this Comparative Example, the stress Pr of the lead plug 17 became 2 MPa when such a load W that the bearing pressure at the upper end face 8 became 12 MPa was supported.

Figure 4:
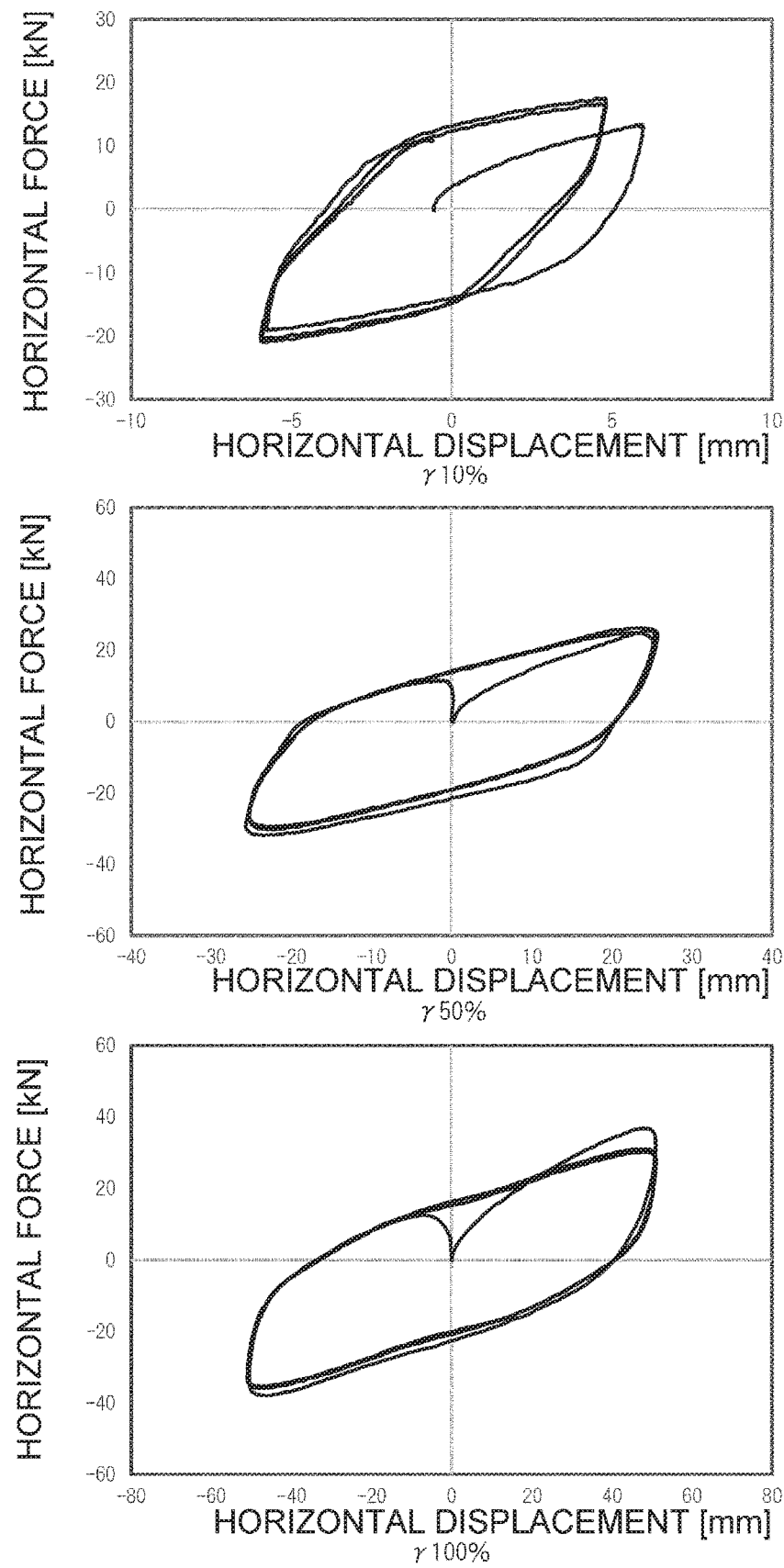
FIG. 4 is an explanatory diagram of test results on hysteresis characteristics between horizontal displacement and horizontal force under no load in preferred Example 1 of the present invention.
Figure 5:
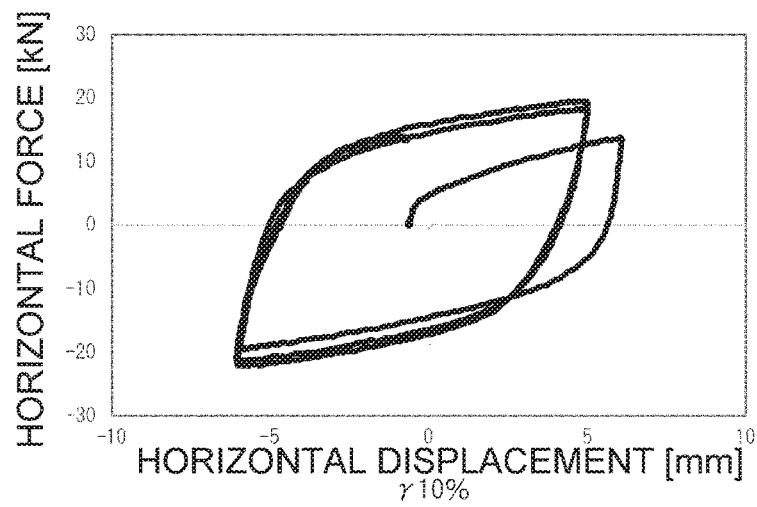
FIG. 5 is an explanatory diagram of test results on hysteresis characteristics between horizontal displacement and horizontal force under a load in preferred Example 2 of the present invention.
Figure 5:
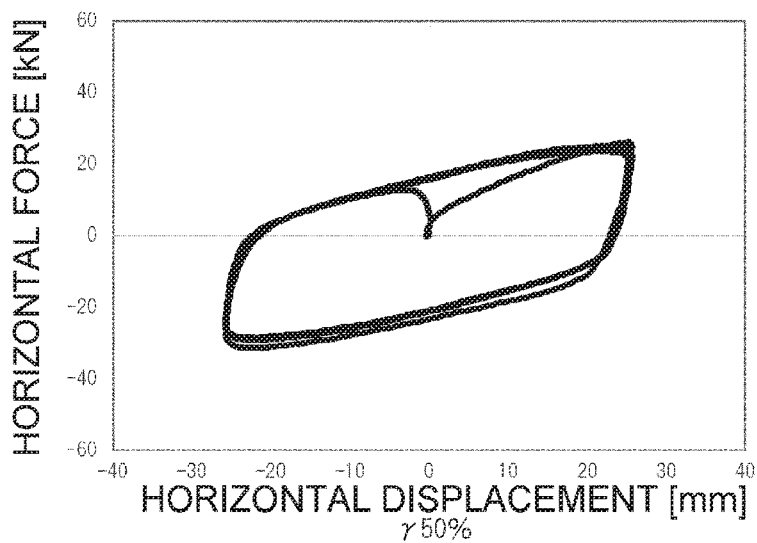
Figure 5:
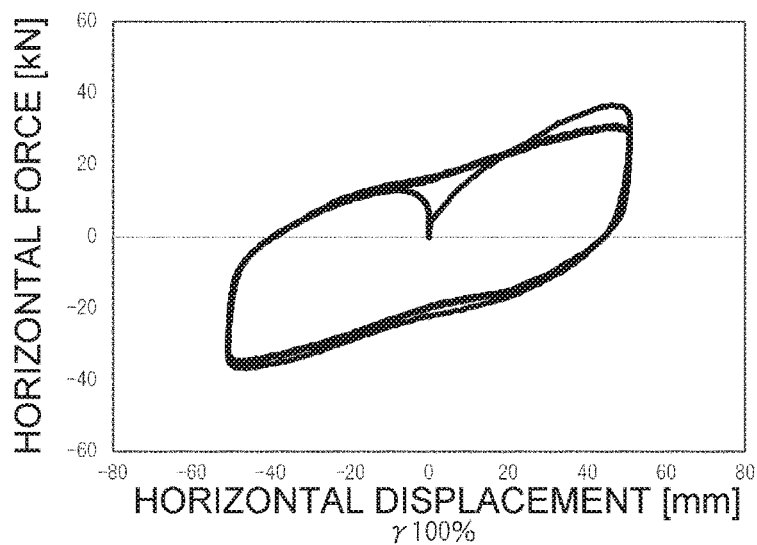
Figure 6:
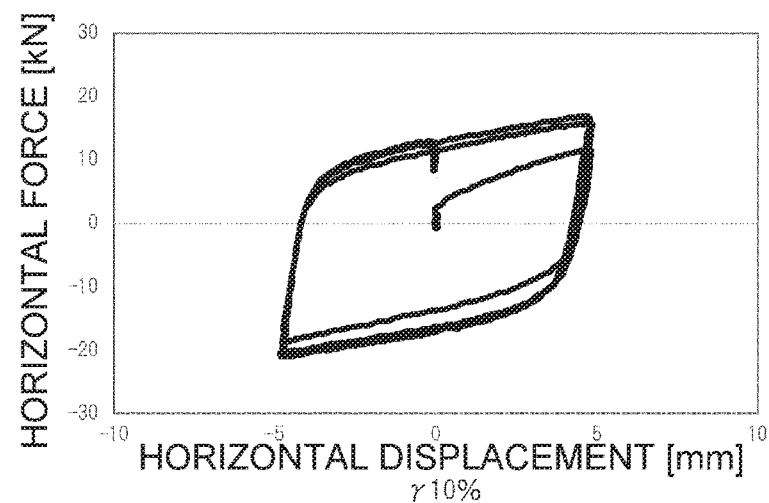
FIG. 6 is an explanatory diagram of test results on hysteresis characteristics between horizontal displacement and horizontal force under a load in preferred Example 3 of the present invention.
Figure 6:
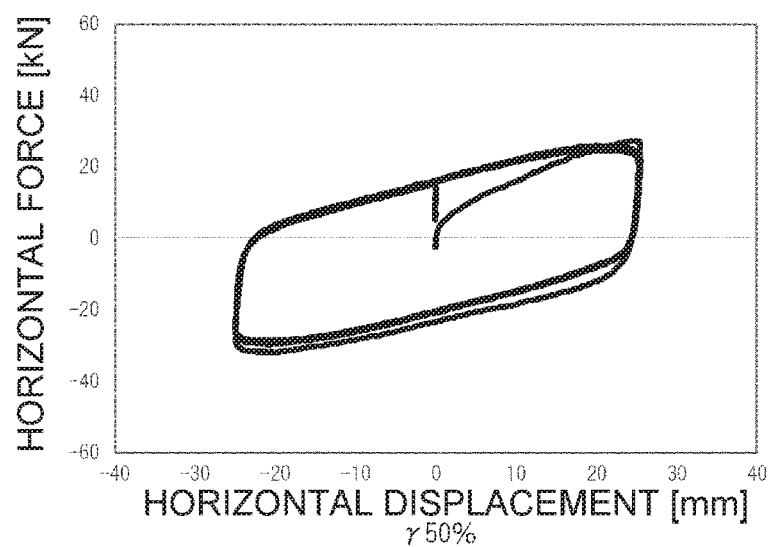
Figure 6:
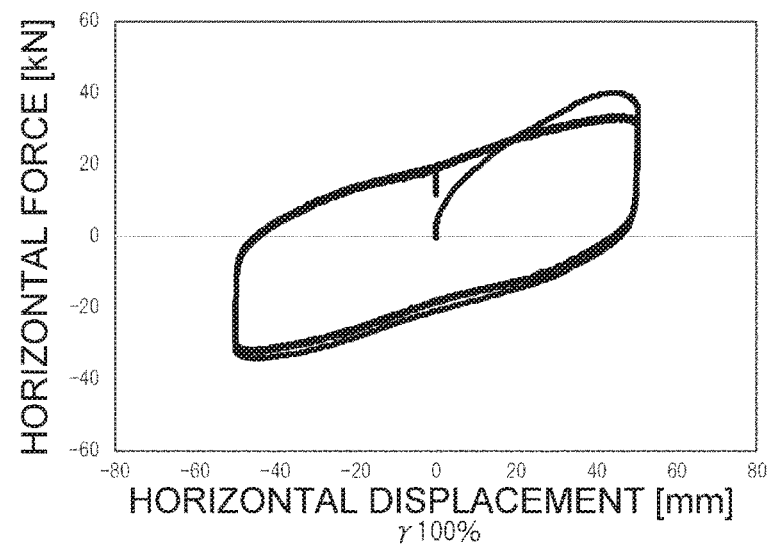
Figure 7:
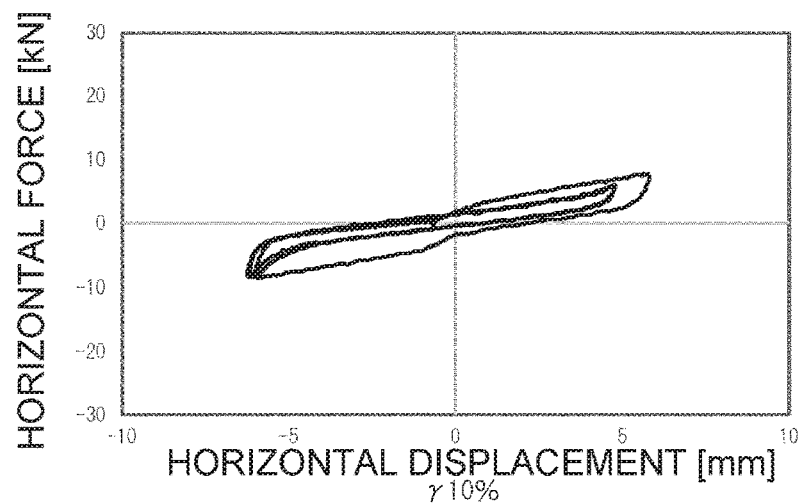
FIG. 7 is an explanatory diagram of test results on hysteresis characteristics between horizontal displacement and horizontal force under a load in Comparative Example of the present invention.
Figure 7:
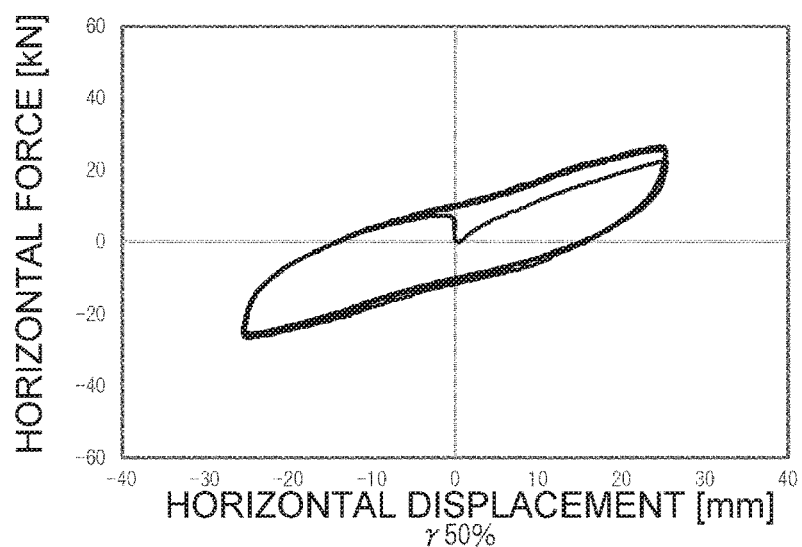
Figure 7:
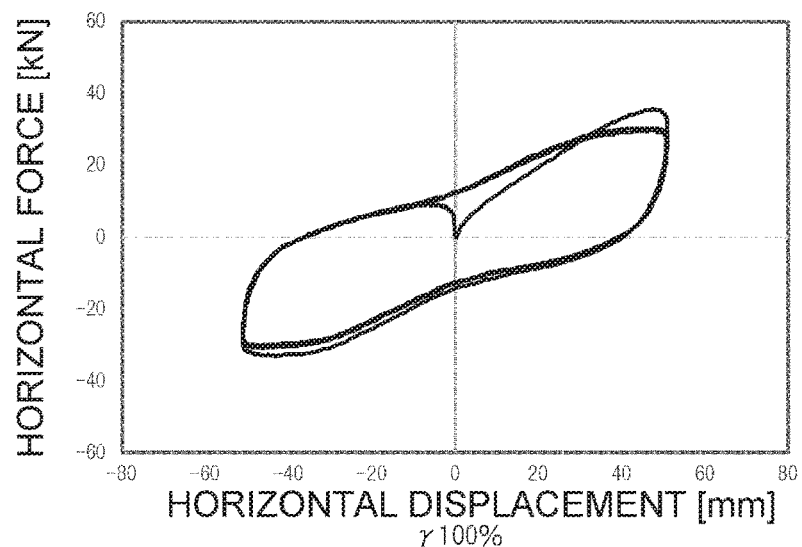

With respect to the seismic isolation apparatuses 1 of Examples 1, 2, and 3 and the seismic isolation apparatus of Comparative Example, FIGS. 4 to 7 show results of measurement of hysteresis characteristics, which are the relationships between the displacement (mm) in the horizontal direction H and the horizontal load (kN) in cases where the shear strain γ (displacement in the horizontal direction H) is 10%, 50%, and 100%. FIG. 4 shows the hysteresis characteristics of Example 1 under no load (load W=0). FIG. 5 shows the hysteresis characteristics of Example 2 under a load (under the load W at which the bearing pressure at the upper end face 8 corresponds to 0.5 MPa). FIG. 6 shows the hysteresis characteristics of Example 3 under a load (under the load W at which the bearing pressure at the upper end face 8 corresponds to 12 MPa). FIG. 7 shows the hysteresis characteristics of Comparative Example under a load (under the load W at which the bearing pressure at the upper end face 8 corresponds to 12 MPa). As is apparent from these results, if the stress Pr of the lead plug 17 is not less than 8 MPa, preferably not less than 17 MPa, it is possible to obtain stable seismic isolation characteristics. It should be noted that it became clear that if the stress Pr is not greater than 55 MPa, the press-fitting of the lead into the hollow portion 14 in the manufacture is facilitated and does not involve much difficulty. In addition, although an attempt was made to press-fit the lead into the hollow portion 14 in excess of 55 MPa, it became clear that it is difficult to do so without accompanying the destruction of the inner peripheral surfaces 15 of the elastic layers 2.

In addition, it was possible to confirm that more stable seismic isolation characteristics can be obtained by filling the lead plug 17 into the hollow portion 14 with a stress of 15 MPa or greater.

DESCRIPTION OF REFERENCE NUMERALS

1: seismic isolation apparatus
2: elastic layer

3: rigid layer
4, 5: outer peripheral surface
6: coating layer
7: laminated body
8: upper end face
9: lower end face
10: upper plate
11: lower plate
12: lower surface
13: upper surface
14: hollow portion
15: inner peripheral surface
16: inner peripheral surface
17: lead plug

The invention claimed is:

1. A seismic isolation apparatus comprising:
   a laminated body having alternately laminated elastic layers and rigid layers; an upper plate and a lower plate which are respectively mounted on an upper end face and a lower end face in a laminated direction of the laminated body; and
   a vibration damping body disposed without clearances with respect to a hollow portion which is surrounded by the elastic layers and the rigid layers and by the upper plate and the lower plate,
   wherein said vibration damping body is filled in the hollow portion with a stress of not less than 8 MPa, and
   wherein said vibration damping body is filled in the hollow portion with a stress of not greater than 55 MPa.

2. The seismic isolation apparatus according to claim 1, wherein said vibration damping body is filled in the hollow portion with a stress of not less than 8 MPa under no load on said laminated body in the laminated direction.

3. The seismic isolation apparatus according to claim 1, wherein said vibration damping body is filled in the hollow portion with a stress of not less than 8 MPa under a load on said laminated body in the laminated direction.

4. The seismic isolation apparatus according to claim 3, wherein said vibration damping body is filled in the hollow portion with a stress of not less than 8 MPa under a load on said laminated body in the laminated direction corresponding to a bearing pressure of 0.5 MPa.

5. The seismic isolation apparatus according to claim 1, wherein said vibration damping body is filled in the hollow portion with a stress of not less than 15 MPa.

6. The seismic isolation apparatus according to claim 1, wherein said vibration damping body is formed of a damping material which absorbs vibrational energy through plastic deformation.

7. The seismic isolation apparatus according to claim 6, wherein the damping material is constituted of lead, tin, or a non-lead-based low melting point alloy.

8. The seismic isolation apparatus according to claim 1, wherein an inner peripheral surface of said laminated body defining the hollow portion is formed into concave surfaces at positions of the elastic layers as said vibration damping body bites into the elastic layers.

9. The seismic isolation apparatus according to claim 1, wherein an inner peripheral surface of said laminated body defining the hollow portion is formed into convex surfaces at positions of the rigid layers as said vibration damping body bites into the elastic layers.

* * * * *